US012638342B2

(12) United States Patent
Nakamura et al.

(10) Patent No.: US 12,638,342 B2
(45) Date of Patent: May 26, 2026

(54) TEMPERATURE SENSOR AND METHOD FOR MANUFACTURING TEMPERATURE SENSOR

(71) Applicants: NIFCO INC., Yokosuka (JP); SEMITEC Corporation, Tokyo (JP)

(72) Inventors: Hiroyuki Nakamura, Yokosuka (JP); Takuhiko Nakajima, Yokosuka (JP); Satoshi Ikeya, Tokyo (JP)

(73) Assignee: NIFCO INC., Yokosuka (JP)

( * ) Notice: Subject to any disclaimer, the term of this patent is extended or adjusted under 35 U.S.C. 154(b) by 557 days.

(21) Appl. No.: 18/020,176

(22) PCT Filed: Aug. 25, 2021

(86) PCT No.: PCT/JP2021/031173
§ 371 (c)(1),
(2) Date: Feb. 7, 2023

(87) PCT Pub. No.: WO2022/045198
PCT Pub. Date: Mar. 3, 2022

(65) Prior Publication Data
US 2023/0296450 A1     Sep. 21, 2023

(30) Foreign Application Priority Data
Aug. 26, 2020     (JP) ................................. 2020-142551

(51) Int. Cl.
*G01K 13/02* (2021.01)
*G01K 1/08* (2021.01)
*G01K 1/14* (2021.01)
(52) U.S. Cl.
CPC ............... *G01K 13/02* (2013.01); *G01K 1/08* (2013.01); *G01K 1/14* (2013.01)

(58) Field of Classification Search
CPC ............ G01K 13/02; G01K 1/08; G01K 1/14; G01K 1/16; G01K 2205/00
See application file for complete search history.

(56) References Cited

U.S. PATENT DOCUMENTS 6,607,302 B2 * 8/2003 Lyle .......................... G01K 1/16
                                                                    374/185
7,147,369 B2 * 12/2006 Gadonniex ............ G01K 13/02
                                                                    374/185
(Continued)

FOREIGN PATENT DOCUMENTS

CN          106053015 A     10/2016
DE           4216412 A1     12/1992
(Continued)

OTHER PUBLICATIONS

International Search Report for PCT/JP2021/031173 dated Nov. 9, 2021 [PCT/ISA/210].
(Continued)

*Primary Examiner* — Nathaniel T Woodward
*Assistant Examiner* — Julia Fitzpatrick
(74) *Attorney, Agent, or Firm* — Sughrue Mion, PLLC

(57) ABSTRACT

Provided are a temperature sensor that performs high-speed sensing, whose cost is low, and whose layout is freely designed, the temperature sensor eliminating the need for complicated operations, and a method for manufacturing the temperature sensor. In a temperature sensor 1, terminal portions 9 of a connector portion 7 are exposed to an outside of a pipe section 2, a connector-side embedded portion 8 of the connector portion 7 is embedded in an embedding portion 4 of a side wall portion 3, an exposed portion 12 of a housing portion 11 is disposed in the pipe section 2, and
(Continued)

an embedded base 13 of the housing portion 11 is embedded in the embedding portion 4. The housing portion 11 is made of a metal.

7 Claims, 5 Drawing Sheets

(56)  References Cited

U.S. PATENT DOCUMENTS

| | | | | |
|---|---|---|---|---|
| 7,293,457 | B2 * | 11/2007 | Uramachi | G01F 1/692 |
| | | | | 73/204.22 |
| 8,523,432 | B2 * | 9/2013 | Mujumdar | G01K 13/02 |
| | | | | 374/208 |

FOREIGN PATENT DOCUMENTS

| | | | | | |
|---|---|---|---|---|---|
| DE | 10029186 | C2 | * | 4/2002 | G01K 1/143 |
| EP | 2679968 | A2 | * | 1/2014 | G01K 1/14 |
| EP | 2339309 | B1 | * | 5/2019 | G01K 13/02 |
| FR | 2949857 | A1 | * | 3/2011 | G01K 13/02 |
| JP | 10-221179 | A | | 8/1998 | |
| JP | 2001267105 | A | * | 9/2001 | |
| JP | 2002-005757 | A | | 1/2002 | |
| JP | 2004-012415 | A | | 1/2004 | |
| JP | 2007-127176 | A | | 5/2007 | |

OTHER PUBLICATIONS

Communication dated Jun. 17, 2025 issued by the State Intellectual Property Office of the P.R. China in application No. 202180051390. 3.

* cited by examiner

TEMPERATURE SENSOR AND METHOD FOR MANUFACTURING TEMPERATURE SENSOR

CROSS REFERENCE TO RELATED APPLICATIONS

This application is a National Stage of International Application No. PCT/JP2021/031173 filed Aug. 25, 2021, claiming priority based on Japanese Patent Application No. 2020-142551 filed Aug. 26, 2020.

TECHNICAL FIELD

The present invention relates to a temperature sensor that senses a fluid temperature to be measured and to a method for manufacturing the temperature sensor.

BACKGROUND ART

For example, existing power control units (PCUs) and engines of automobiles, motorcycles, aircraft, ships, and the like (hereinafter referred to as "automobiles and the like") include pipes for causing a cooling fluid such as a long life coolant (LLC) to flow therein. A temperature sensor is attached to such a pipe.

A temperature sensor described in PTL 1 below (hereinafter referred to as "the invention in publicly known literature 1") is inserted into a hole preformed in an outer wall of an engine and is fixed from the outside with a screw. In the invention in publicly known literature 1, a thermistor is incorporated, and a sensor body is made of a resin and is integrally formed with an O-ring.

In a structure in which a sensor member is attached described in PTL 2 below (hereinafter referred to as "the invention in publicly known literature 2"), a temperature sensor is inserted, via a sensor mount, into a through hole preformed in a pipe-shaped body. An attachment surface is formed at the through hole. The sensor mount is integrally formed with a nut member into which the temperature sensor is screwed.

CITATION LIST

Patent Literature

PTL 1: Japanese Unexamined Patent Application Publication No. 2004-12415
PTL 2: Japanese Unexamined Patent Application Publication No. 2007-127176

SUMMARY OF INVENTION

Technical Problem

However, as described above, in the invention in publicly known literature 1, the sensor body is made of a resin and thus has poor thermal conductivity. Accordingly, sensing by the thermistor is slow. On the other hand, in the invention in publicly known literature 2, the sensor mount integrally formed with the nut member into which the temperature sensor is screwed is attached to the attachment surface formed at the through hole. Accordingly, the invention in publicly known literature 2 has a large number of components, thus increasing the material costs and complicating the assembly operation. In addition, a space for attaching the sensor mount has to be secured, thus limiting the layout.

The present invention is proposed in view of such circumstances. That is, an object of the present invention is to provide a temperature sensor that performs high-speed sensing, whose cost is low, and whose layout is freely designed, the temperature sensor eliminating the need for complicated operations, and a method for manufacturing the temperature sensor.

Solution to Problem

To achieve the above object, a temperature sensor according to the present invention includes: a pipe section in which a fluid flows; a connector portion embedded in a side wall portion of the pipe section in a state of being exposed to an outside of the pipe section; and a housing portion made of a metal, the housing portion covering a temperature sensing element connected to the connector portion, the housing portion being embedded in the side wall portion in a state of projecting into the pipe section.

In the temperature sensor according to the present invention, the pipe section and the connector portion are made of a resin, and the connector portion and the housing portion are integrally formed with the pipe section. That is, the connector portion and the housing portion are insert-molded together with the pipe section.

The temperature sensor according to the present invention further includes a sealing portion disposed at a boundary between the connector portion and the housing portion.

In the temperature sensor according to the present invention, the sealing portion is an O-ring and is embedded in the side wall portion.

In the temperature sensor according to the present invention, the housing portion has a columnar shape.

A method for manufacturing a temperature sensor according to the present invention is a method including insert-molding, together with a pipe section in which a fluid whose temperature is to be measured flows, a sensor section including a connector portion and a housing portion made of a metal, the housing portion covering a temperature sensing element connected to the connector portion, in a state in which the connector portion is exposed to an outside of the pipe section and in which the housing portion projects into the pipe section.

Advantageous Effects of Invention

The temperature sensor according to the present invention includes: the pipe section in which a fluid flows; the connector portion embedded in the side wall portion of the pipe section in the state of being exposed to the outside of the pipe section; and the housing portion made of a metal, the housing portion covering the temperature sensing element connected to the connector portion, the housing portion being embedded in the side wall portion in the state of projecting into the pipe section. That is, the housing portion made of a metal is excellent in thermal conductivity and thus conducts a fluid temperature rapidly to the temperature sensing element, thus achieving high-speed sensing. The temperature sensor is formed by the pipe section, the connector portion, and the housing portion and thus has a small number of components. In addition, each part is previously embedded. Accordingly, the temperature sensor eliminates the need for assembly operations, thus achieving a low cost. The temperature sensor eliminates the need for a mount and a hole for inserting the housing portion thereinto and thus eliminates the need for securing spaces for these components. The location where the housing portion is embedded can be freely determined, thus enabling the layout to be freely designed.

In the temperature sensor according to the present invention, the pipe section and the connector portion are made of a resin, and the connector portion and the housing portion are integrally formed with the pipe section. That is, each part other than the housing portion is made of a resin. Thus, it is possible to inhibit thermal conduction to the temperature sensing element from being affected by outside air. The temperature sensor is integrally formed and thus eliminates the need for assembly operations, thus achieving a low cost. In addition, such integral formation eliminates the need for securing spaces for a mount and a hole for inserting the housing portion thereinto. The shape of the pipe section and the disposition of the housing portion can be freely determined, thus enabling the layout to be freely designed.

The temperature sensor according to the present invention further includes the sealing portion disposed at the boundary between the connector portion and the housing portion, thus achieving high airtightness.

In the temperature sensor according to the present invention, the sealing portion is the O-ring and is embedded in the side wall portion. That is, the O-ring is versatile, thus achieving a simple structure. In addition, the O-ring is embedded in the side wall portion at the boundary between the connector portion and the housing portion, thus achieving higher airtightness.

In the temperature sensor according to the present invention, the housing portion has a columnar shape. Accordingly, the housing portion conducts heat uniformly, thus achieving accurate sensing.

The method for manufacturing a temperature sensor according to the present invention is the method including insert-molding, together with the pipe section in which a fluid whose temperature is to be measured flows, the sensor section including the connector portion and the housing portion made of a metal, the housing portion covering the temperature sensing element connected to the connector portion, in the state in which the connector portion is exposed to the outside of the pipe section and in which the housing portion projects into the pipe section. Thus, it is possible to manufacture a temperature sensor that achieves the effects described above.

DESCRIPTION OF EMBODIMENTS

Figure 1:
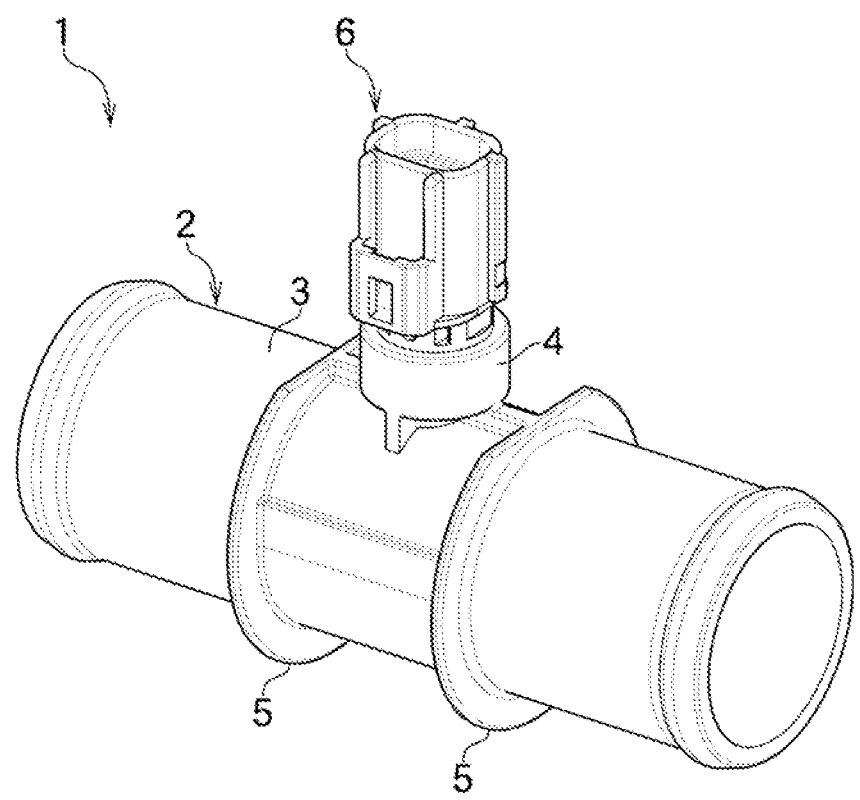
FIG. 1 is an external perspective view of a temperature sensor according to an embodiment of the present invention.
Figure 2:
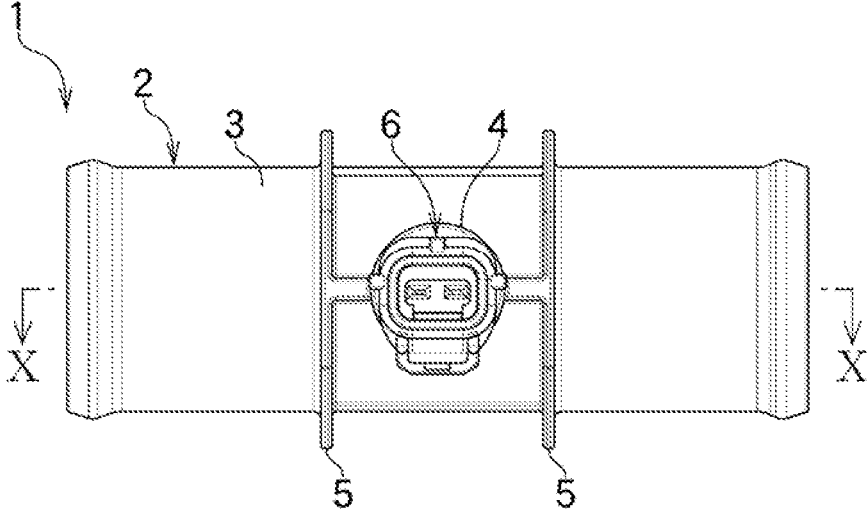
FIG. 2 is a top view of the temperature sensor according to the embodiment of the present invention.
Figure 3:
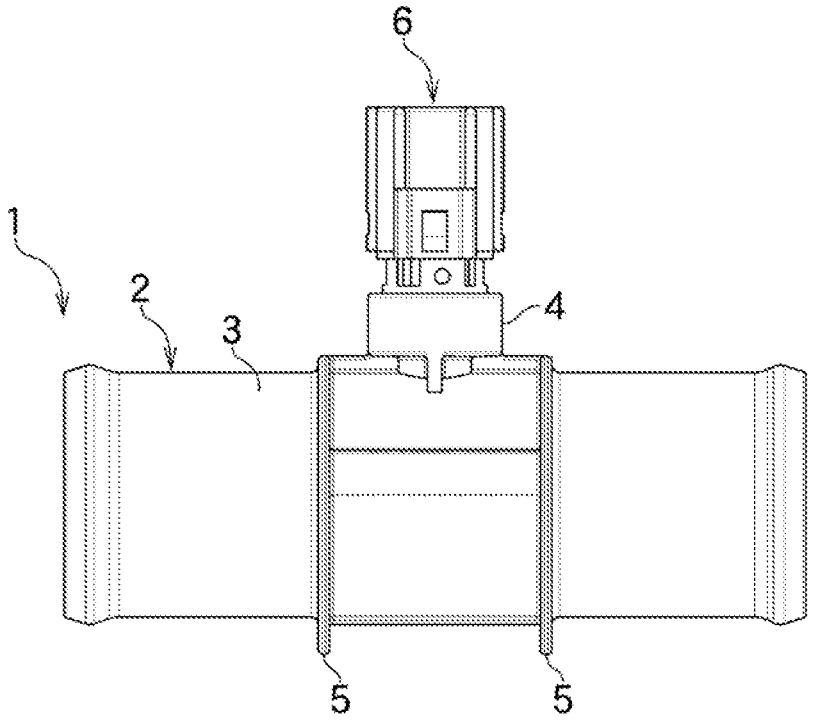
FIG. 3 is a front view of the temperature sensor according to the embodiment of the present invention.
Figure 4:
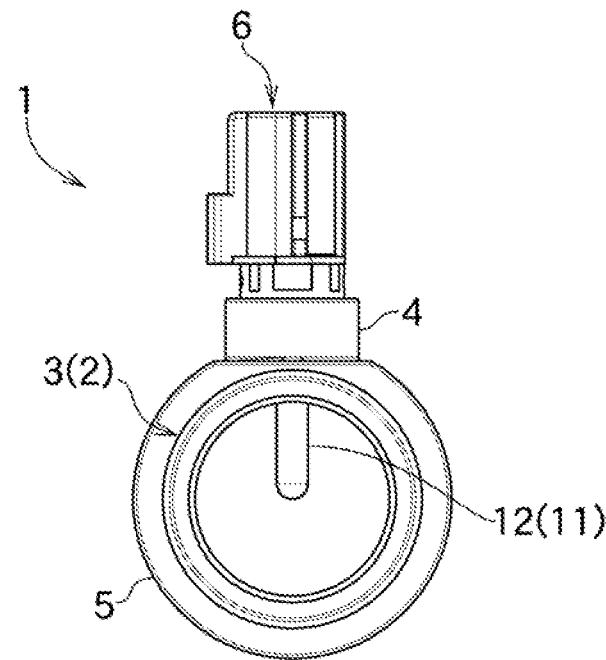
FIG. 4 is a side view of the temperature sensor according to the embodiment of the present invention.
Figure 5:
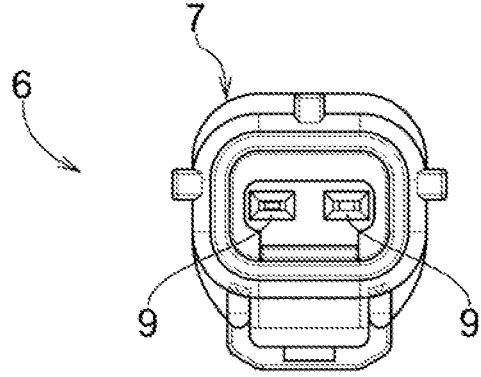
FIG. 5 is a top view of a sensor section of the temperature sensor according to the embodiment of the present invention.
Figure 6:
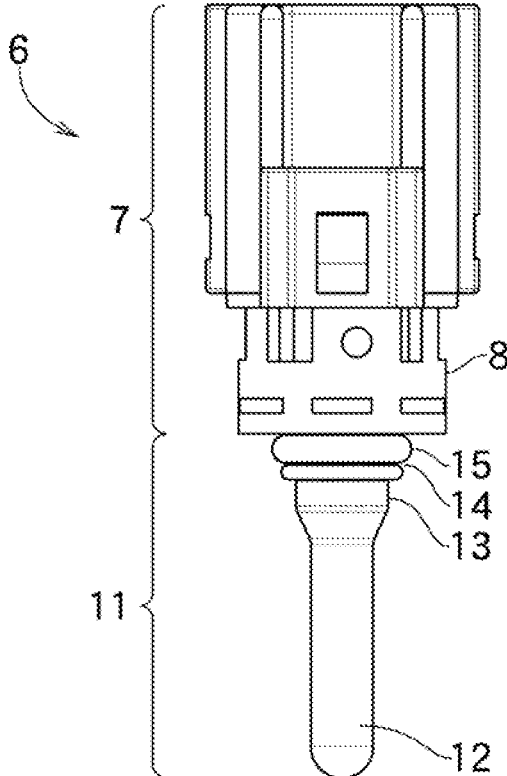
FIG. 6 is a front view of the sensor section of the temperature sensor according to the embodiment of the present invention.
Figure 7:
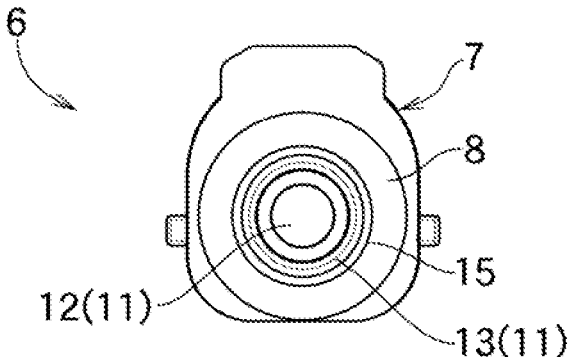
FIG. 7 is a bottom view of the sensor section of the temperature sensor according to the embodiment of the present invention.
Figure 8:
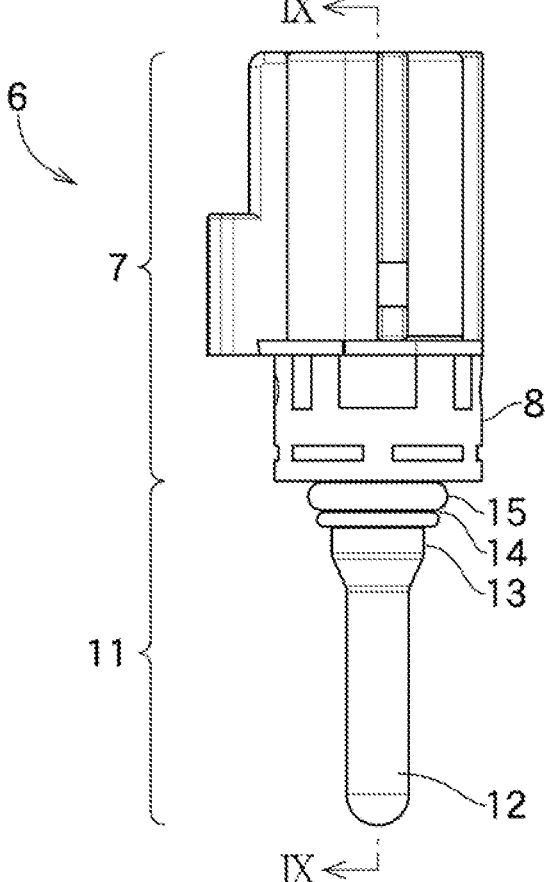
FIG. 8 is a side view of the sensor section of the temperature sensor according to the embodiment of the present invention.
Figure 9:
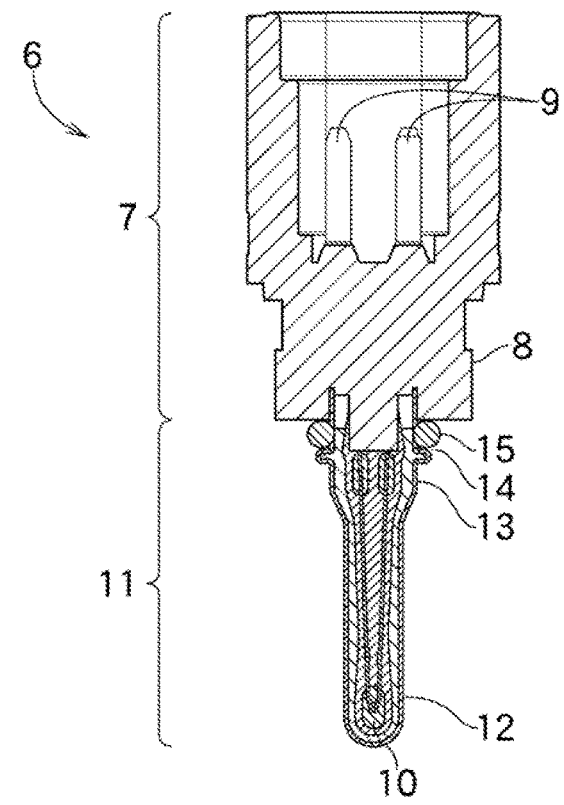
FIG. 9 is a rear sectional view of the sensor section of the temperature sensor according to the embodiment of the present invention, the rear sectional view being taken along section IX-IX in FIG. 8.

A temperature sensor according to an embodiment of the present invention will be described below with reference to drawings. FIGS. 1 to 4 illustrate the exterior of a temperature sensor 1 according to the present embodiment.

As illustrated in FIGS. 1 to 4, the temperature sensor 1 includes a pipe section 2, which is usable as a pipe of an engine (not illustrated) or a PCU (not illustrated) and in which a fluid such as an LLC whose temperature is to be measured flows, and a sensor section 6, which is integrally formed with the pipe section 2. That is, the sensor section 6 is set in a die (not illustrated) for the pipe section 2, and the members 2 and 6 are molded into a single component by injection molding such as insert molding or multicolor molding.

The pipe section 2 is made of a resin and has a cylindrical shape. A side wall portion 3 of the pipe section 2 has an embedding portion 4, in which the sensor section 6 is embedded. The embedding portion 4 projects outward from the side wall portion 3. The side wall portion 3 has flange portions 5 at respective sides of the embedding portion 4. Both the flange portions 5 have a ring shape along the outer periphery of the pipe section 2.

Here, the sensor section 6 will be described with reference to drawings. FIGS. 5 to 9 illustrate the exterior and a section of the sensor section 6.

As illustrated in FIGS. 5 to 9, the sensor section 6 includes a connector portion 7, which is to be connected to an external device (not illustrated), a temperature sensing element 10, which is connected to the connector portion 7, a housing portion 11, which covers the temperature sensing element 10 and which is connected to the connector portion 7, and a sealing portion 15, which is disposed at the boundary between the connector portion 7 and the housing portion 11.

The connector portion 7 is made of a resin. The connector portion 7 has a connector-side embedded portion 8 at a tip end thereof, and a pair of terminal portions 9 therein. The terminal portions 9 are connected to the temperature sensing element 10 via lead wires (not illustrated) embedded in the connector portion 7. The temperature sensing element 10 is, for example, a thermistor. The temperature sensing element 10 is covered with the housing portion 11. The housing portion 11 is connected to the connector-side embedded portion 8.

The housing portion 11 is made of a metal and has a columnar shape. The housing portion 11 has an exposed portion 12 at a tip end thereof, and a groove portion 14, which has a ring shape, at an embedded base 13, which is the side connected to the connector-side embedded portion 8 of the connector portion 7. The sealing portion 15 is attached to the groove portion 14. That is, the sealing portion 15 is disposed at the boundary between the connector portion 7 and the housing portion 11. The sealing portion 15 is, for example, an O-ring.

Here, the disposition of the sensor section 6 and the pipe section 2 will be described with reference to a drawing. FIG.

10 illustrates a section of the temperature sensor 1 and illustrates how the sensor section 6 is embedded in the pipe section 2.

Figure 10:
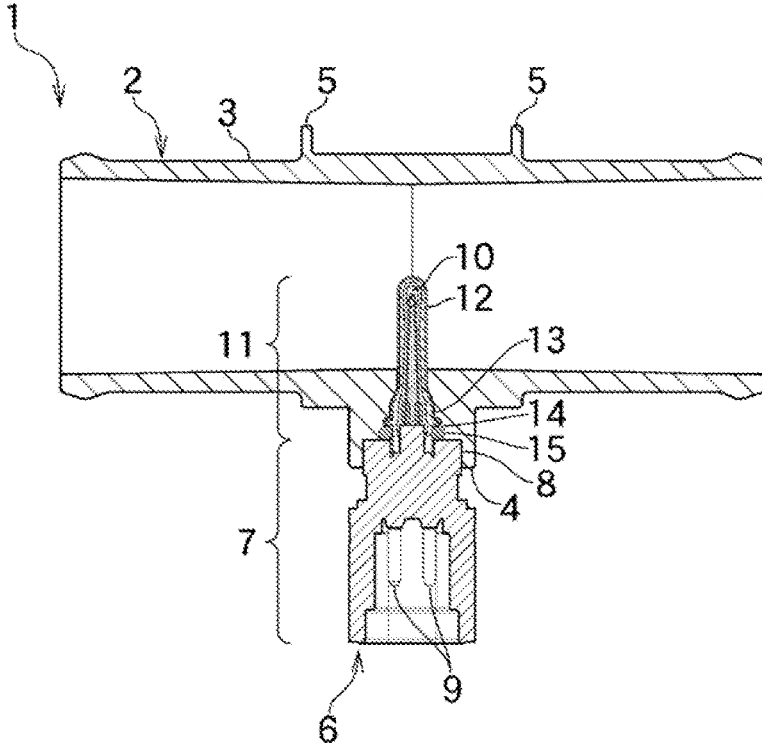
FIG. 10 is a front sectional view of the temperature sensor according to the embodiment of the present invention, the front sectional view being taken along section X-X in FIG. 2.

As illustrated in FIG. 10, the connector portion 7 of the sensor section 6 is embedded in the side wall portion 3 of the pipe section 2 in a state of being exposed to the outside of the pipe section 2, and the housing portion 11 of the sensor section 6 is embedded in the side wall portion 3 in a state of projecting into the pipe section 2. Specifically, the connector-side embedded portion 8 of the connector portion 7 is embedded in the embedding portion 4 of the side wall portion 3, and the terminal portions 9 of the connector portion 7 are disposed outside the pipe section 2. The embedded base 13 of the housing portion 11 is embedded in the embedding portion 4. The exposed portion 12 of the housing portion 11 is disposed in the pipe section 2. Since the connector-side embedded portion 8 and the embedded base 13 are embedded in the embedding portion 4, the sealing portion 15 is also embedded in the embedding portion 4.

The present embodiment is configured as described above.

Next, effects of the present embodiment will be described.

As described above, in the present embodiment, the housing portion 11, which covers the temperature sensing element 10, of the sensor section 6 of the temperature sensor 1 is made of a metal. That is, the housing portion 11 made of a metal is excellent in thermal conductivity and thus conducts a fluid temperature rapidly to the temperature sensing element 10, thus achieving high-speed sensing. In addition, since the housing portion 11 has a columnar shape, the housing portion 11 conducts heat uniformly, thus achieving accurate sensing.

In the present embodiment, the sensor section 6 is injection-molded together with the pipe section 2 in a state in which the terminal portions 9 of the connector portion 7 are exposed to the outside of the pipe section 2, in which the connector-side embedded portion 8 of the connector portion 7 is embedded in the embedding portion 4 of the side wall portion 3, in which the exposed portion 12 of the housing portion 11 is disposed in the pipe section 2, and in which the embedded base 13 of the housing portion 11 is embedded in the embedding portion 4. That is, the temperature sensor 1 is formed by the pipe section 2 and the sensor section 6 and thus has a small number of components. In addition, the temperature sensor 1 is integrally formed, and the connector-side embedded portion 8 and the embedded base 13 are previously embedded. Accordingly, the temperature sensor 1 eliminates the need for assembly operations, thus achieving a low cost. Such integral formation eliminates the need for a mount and a hole for inserting the housing portion 11 thereinto and thus eliminates the need for securing spaces for these components. The shape of the pipe section 2 and the location where the sensor section 6 is embedded can be freely determined, thus enabling the layout to be freely designed.

In the present embodiment, the sealing portion 15 is attached to the groove portion 14 of the housing portion 11 and is thus disposed at the boundary between the connector portion 7 and the housing portion 11, and the sealing portion 15 is also embedded in the embedding portion 4, thus achieving high airtightness. In addition, the O-ring is versatile, thus achieving a simple structure. In addition, the groove portion 14 is formed between the connector-side embedded portion 8 and a bulge portion that is a ring-shaped projection formed around an outer peripheral surface of the embedded base 13, and the sealing portion 15 is attached to the groove portion 14. Thus, the sealing portion 15 is securely compressed and held by the bulge portion and the connector-side embedded portion 8 and does not shift. Furthermore, during insert molding, the sealing portion 15 can be securely compressed from the outside by a resin pressure, thus achieving high airtightness.

Next, examples of the present invention will be described.

A sensing performance test for the sensor section 6 was performed. An example is the sensor section 6 including the housing portion 11 made of a metal (SUS 316). A comparative example is a sensor section including a housing portion made of a resin (polybutylene terephthalate (PBT)). In the test, the example and the comparative example were placed in still air at a room temperature of 25° C., and each housing portion was dipped in a stirred oil at 100° C. as a load to measure a thermal time constant. The depth of the dipped part is 0.5 mm. The test for the example and the test for the comparative example were each performed two times. In each test, the thermal time constant was measured three times, and the average of the three constants was calculated. In addition, the average of the calculated averages in the two tests was calculated. The test results are given in Tables 1 and 2.

TABLE 1

| Example Metal (SUS 316) | |
| --- | --- |
| Test No. | Thermal Time Constant T (s) |
| 1 | 6.2 |
| 2 | 6.0 |
| Average | 6.1 | n = 2 Average of Three Measured Constants in Each Test

TABLE 2

| Comparative Example Resin (PBT) | |
| --- | --- |
| Test No. | Thermal Time Constant T (s) |
| 1 | 7.7 |
| 2 | 7.7 |
| Average | 7.7 | n = 2 Average of Three Measured Constants in Each Test

As given in Tables 1 and 2, the thermal time constant of the example is lower than the thermal time constant of the comparative example. Thus, it is clear that the example is excellent in sensing performance.

In addition, an airtightness performance test for the temperature sensor 1 was performed. An example includes the sealing portion 15. In the test, a pressure of 350 kPa was applied to the pipe section 2, and, after ten minutes, whether gas was leaked from the embedding portion 4 was determined. It was clear from the determination result that gas was not leaked from the embedding portion 4. Thus, it is clear that the temperature sensor 1 integrally formed with the sealing portion 15 embedded in the embedding portion 4 is excellent in airtightness performance.

In other embodiments according to the present invention, a pipe section can have any shape, and a sensor section can be embedded in any position.

In other embodiments, a side wall portion does not have an embedding portion. That is, the side wall portion has a thickness required for embedding a connector-side embedded portion and an embedded base of a sensor section.

In other embodiments, a pipe section, a connector portion, a housing portion, a temperature sensing element, and terminals are integrally formed with each other. That is, such an embodiment is integrally formed without including a sensor section.

In other embodiments, a housing portion does not have a columnar shape and can have any shape.

The embodiment of the present invention has been specifically described above. However, the present invention is not limited to the embodiment described above. Various design modifications of the present invention can be made without departing from the contents described in the claims.

REFERENCE SIGNS LIST 1 temperature sensor
2 pipe section
3 side wall portion
4 embedding portion
5 flange portion
6 sensor section
7 connector portion
8 connector-side embedded portion
9 terminal portion
10 temperature sensing element
11 housing portion
12 exposed portion
13 embedded base
14 groove portion
15 sealing portion

The invention claimed is:

1. A temperature sensor comprising:

a sensor section including a connector portion made of a resin, the connector portion which is pre-molded from the resin, the connector portion which has a terminal portion therein and a housing portion made of a metal, the housing portion covering a temperature sensing element connected to the terminal portion, the housing portion connected to the connector portion; and a pipe section made of a resin, the pipe section in which a fluid flows;

the connector portion and the housing portion are integrally formed with the pipe section, in a state in which the pre-molded connector portion is embedded in a side wall portion of the pipe section in a state of being exposed to an outside of the pipe section and in which the housing portion is embedded in the side wall portion in a state of projecting into the pipe section.

2. The temperature sensor according to claim 1, further comprising a sealing portion disposed at a boundary between the connector portion and the housing portion, and the sealing portion is embedded in an embedding portion, which projects outward from the side wall portion.

3. The temperature sensor according to claim 2, wherein the sealing portion is an O-ring and is embedded in the side wall portion.

4. The temperature sensor according to claim 1, wherein the housing portion has a columnar shape.

5. A method for manufacturing a temperature sensor, the method comprising insert-molding, together with a pipe section made of a resin, the pipe section in which a fluid whose temperature is to be measured flows, a sensor section including a connector portion made of a resin, the connector portion which is pre-molded from the resin, the connector portion which has a terminal portion therein and a housing portion made of a metal, the housing portion covering a temperature sensing element connected to the terminal portion, the housing portion connected to the connector portion, in a state in which the pre-molded connector portion is exposed to an outside of the pipe section and in which the housing portion projects into the pipe section.

6. The temperature sensor according to claim 2, wherein the housing portion has a columnar shape.

7. The temperature sensor according to claim 3, wherein the housing portion has a columnar shape.

* * * * *